United States Patent
Kawakami et al.

(10) Patent No.: US 8,416,664 B1
(45) Date of Patent: Apr. 9, 2013

(54) DRIVING CIRCUIT FOR STEPPING MOTOR

(71) Applicants: Hiroaki Kawakami, Gunma-ken (JP); Masashi Tanabe, Gunma-ken (JP)

(72) Inventors: Hiroaki Kawakami, Gunma-ken (JP); Masashi Tanabe, Gunma-ken (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 13/630,922

(22) Filed: Sep. 28, 2012

(30) Foreign Application Priority Data

Sep. 28, 2011 (JP) .................. 2011-213044

(51) Int. Cl.
G11B 20/00 (2006.01)

(52) U.S. Cl. ..................... 369/53.38; 369/220

(58) Field of Classification Search .......... None
See application file for complete search history.

(56) References Cited

U.S. PATENT DOCUMENTS 6,445,649 B1 * 9/2002 Saito et al. .................. 369/30.1
2007/0206460 A1 * 9/2007 Ono et al. .................. 369/44.32

FOREIGN PATENT DOCUMENTS

| JP | 2000-173203 A | 6/2000 |
| JP | 2009-065806 A | 3/2009 |

* cited by examiner

*Primary Examiner* — Paul Huber
(74) *Attorney, Agent, or Firm* — Osha Liang LLP

(57) ABSTRACT

A stepping-motor-driving circuit for an optical pickup: includes a control-signal-generating circuit to generate a plurality of control signals for supplying driving currents to driving coils having a plurality of phases during energized periods, with a de-energized period therebetween; a plurality of output circuits to supply the currents to the respective coils, in response to the signals; an induced-voltage-detecting circuit to compare a voltage generated each in the coils with a threshold voltage during the de-energized period; a threshold-voltage-setting circuit; and a determining circuit to determine whether a collision state is present where the pickup reaches an end of a movement range, based on an induced-voltage-detecting-circuit-detection result, the threshold voltage set at a voltage between a voltage generated each in the coils during the de-energized period when the stepping motor stops or rotates in the state, and a voltage generated therein in the de-energized period when no collision state is present.

12 Claims, 12 Drawing Sheets

DRIVING CIRCUIT FOR STEPPING MOTOR

CROSS-REFERENCE TO RELATED APPLICATION

This application claims the benefit of priority to Japanese Patent Application No. 2011-213044, filed Sep. 28, 2011, of which full contents are incorporated herein by reference.

BACKGROUND OF THE INVENTION

1. Field of the Invention

The present invention relates to a driving circuit for a stepping motor.

2. Description of the Related Art

An optical disc apparatus includes an optical pickup configured to emit a laser beam to an optical disc and receives the laser beam reflected by the optical disc. A stepping motor is used to move the optical pickup in the radial direction of the optical disc.

In the optical disc apparatus, a position in the radial direction (hereinafter, referred to as "radial position") of the optical pickup needs to be determined when the power of the optical disc apparatus is turned on. Therefore, when the power is turned on, the radial position of the optical pickup is determined by moving the optical pickup to the end of the range of the movement of the optical pickup in the radial direction of the optical disc (generally an innermost or an outermost circumferential portion).

For example, Japanese Laid-Open Patent Publication No. 2009-65806 discloses a stepping motor driving apparatus configured to detect an induced voltage generated in a driving coil of the stepping motor and determine whether a rotor of the stepping motor is stopped, based on the detected induced voltage. As such, whether the rotor is stopped is determined based on the induced voltage, thereby being able to detect the state where the optical pickup reaches the innermost or the outermost circumferential part (hereinafter, referred to as "collision state"), without using any position detecting means such as an optical sensor or a contact switch. The radial position of the optical pickup is able to be determined as well as it is possible to prevent wearing away of portions such as a screw shaft that is rotated by the stepping motor and the gear portion that meshes with the screw shaft, by stopping the supply of a driving current to the driving coil after the detection of the collision state.

Whereas, for example, Japanese Laid-Open Patent Publication No. 2000-173203 discloses a pickup moving apparatus having a releasing unit, configured to release the meshing of the screw shaft with the gear portion, provided at each of the innermost and the outermost positions of the screw shaft. As such, it is possible to prevent the wearing away in the central portion of the gear portion without using any position detecting means by releasing the meshing of the screw shaft with the gear portion at the ends of the screw shaft at which the optical pickup is in the collision state, and causing the screw shaft to rotate free. It is possible to move the optical pickup in the opposite direction by reversely rotating the screw shaft by biasing the optical pickup, which has been moved to the end of the screw shaft, such that the gear portion meshes with the screw shaft.

The stepping motor driving apparatus of the above Japanese Laid-Open Patent Publication No. 2009-65806 is configured to detect the collision state based on the result of the determination on whether the rotor is stopped. However, the pickup moving apparatus of the above Japanese Laid-Open Patent Publication No. 2000-173203 may not be able to detect the collision state when the stepping motor driving apparatus of the above Japanese Laid-Open Patent Publication No. 2009-65806 is applied thereto because the screw shaft rotates free and the rotor does not stop in the collision state.

Therefore, different methods of determining the presence of the collision state need to be used depending on whether the rotor stops or rotates in the collision state.

SUMMARY OF THE INVENTION

A driving circuit for a stepping motor according to an aspect of the present invention, which is configured to move an optical pickup in a radial direction of an optical disc, the optical pickup configured to emit a laser beam to the optical disc as well as receive the laser beam reflected by the optical disc, the driving circuit includes: a control signal generating circuit configured to generate a plurality of control signals for supplying driving currents to driving coils having a plurality of phases of the stepping motor during energized periods, with a de-energized period therebetween during which no driving current is supplied; a plurality of output circuits configured to supply the driving currents to the respective driving coils having the plurality of phases, in response to the plurality of control signals; an induced voltage detecting circuit configured to detect an induced voltage by comparing, with a threshold voltage, a voltage generated in each of the driving coils having the plurality of phases, during the de-energized period; a threshold voltage setting circuit configured to set the threshold voltage; and a determining circuit configured to determine whether a collision state is present where the optical pickup reaches an end of a range of movement in a radial direction of the optical disc, based on a detection result of the induced voltage detecting circuit, the threshold voltage set at a voltage between a voltage generated in each of the driving coils having the plurality of phases during the de-energized period when a rotor of the stepping motor stops or rotates in the collision state, and a voltage generated in each of the driving coils having the plurality of phases in the de-energized period when no collision state is present.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Configuration of Entire Driving Circuit for Stepping Motor

A configuration of the entire driving circuit for a stepping motor according to an embodiment of the present invention will be described below with reference to FIG. 1.

Figure 1:
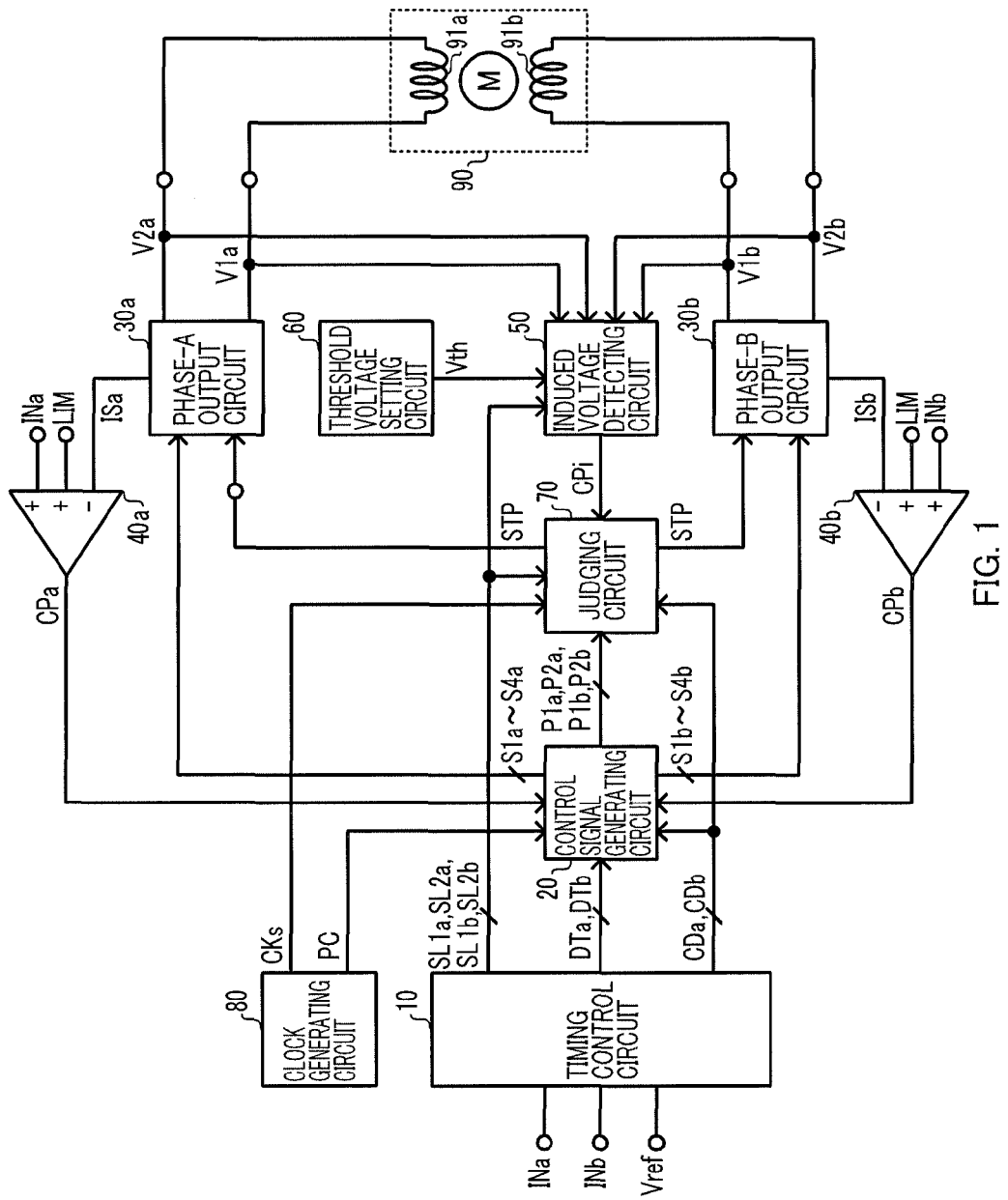
FIG. 1 is a circuit block diagram of a configuration of the entire driving circuit for a stepping motor in an embodiment of the present invention.

The stepping motor driving circuit depicted in FIG. 1 is a driving circuit for a stepping motor 90 configured to move an optical pickup in the radial direction of an optical disc, and as an example, drive the two-phase bipolar excitation type stepping motor 90 that includes a phase-A driving coil 91a and a phase-B driving coil 91b. The stepping motor driving circuit includes a timing control circuit 10, a control signal generating circuit 20, a phase-A output circuit 30a, a phase-B output circuit 30b, a phase-A current control circuit 40a, a phase-B current control circuit 40b, an induced voltage detecting circuit 50, a threshold voltage setting circuit 60, a determining circuit 70, and a clock generating circuit 80.

The clock generating circuit 80 is configured to output a PWM carrier (carrier wave) signal PC and a sampling clock signal CKs.

A phase-A input signal INa and a phase-B input signal INb, and a reference voltage Vref are inputted to the timing control circuit 10. The timing control circuit 10 is configured to output current direction signals CDa and CDb, energization timing signals DTa and DTb, and selection signals SL1a, SL2a, SL1b, and SL2b.

The PWM carrier signal PC, the current direction signals CDa and CDb, and the energization timing signals DTa and DTb are inputted to the control signal generating circuit 20. Further, comparison result signals CPa and CPb respectively outputted from the phase-A and the phase-B current control circuits 40a and 40b are also inputted to the control signal generating circuit 20. The control signal generating circuit 20 is configured to output control signals S1a to S4a and S1b to S4b and output-state signals P1a, P2a, P1b, and P2b.

The control signals S1a to S4a are inputted to the phase-A output circuit 30a, and a stop signal STP outputted from the determining circuit 70 is also inputted thereinto. An output node of the phase-A output circuit 30a is connected to the phase-A driving coil 91a. The phase-A output circuit 30a is configured to also output a current detection signal ISa.

Whereas, the control signal S1b to S4b and the stop signal STP are inputted to the phase-B output circuit 30b. An output node of the phase-B output circuit 30b is connected to the phase-B driving coil 91b. The phase-B output circuit 30b is configured to also output a current detection signal ISb.

The phase-A current control circuit 40a is configured with a comparator that includes one inverting input and two non-inverting inputs, for example. The current detection signal ISa is inputted to the inverting input of the comparator, the phase-A input signal INa is inputted to the first non-inverting input thereof, and a current limit signal LIM is inputted to the second non-inverting input thereof. The phase-A current control circuit 40a is configured to output the comparison result signal CPa.

On the other hand, the phase-B current control circuit 40b is also configured with a comparator that includes one inverting input and two non-inverting inputs, for example. The current detection signal ISb is inputted to the inverting input of the comparator, the phase-B input signal INb is inputted to the first non-inverting input thereof, and the current limit signal LIM is inputted to the second non-inverting input thereof. The phase-B current control circuit 40b is configured to output the comparison result signal CPb.

The threshold voltage setting circuit 60 is configured to output a threshold voltage Vth. Voltages V1a and V2a at the ends of the phase-A driving coil 91a, voltages V1b and V2b at the ends of the phase-B driving coil 91b, and the threshold voltage Vth are inputted to the induced voltage detecting circuit 50. The induced voltage detecting circuit 50 is configured to output a comparison result signal CPi.

The sampling clock signal CKs, the current direction signals CDa and CDb, the selection signals SL1a, SL2a, SL1b, and SL2b, the output-state signals P1a, P2a, P1b, and P2b, and the comparison result signal CPi are inputted to the determining circuit 70.

Configuration of Output Circuit

A more specific configuration of the phase-A output circuit 30a (phase-B output circuit 30b) will be described with reference to FIG. 2. In an embodiment of the present invention, each of output transistors is on when a control signal inputted to a gate thereof is high, and is turned off when the control signal is low.

Figure 2:
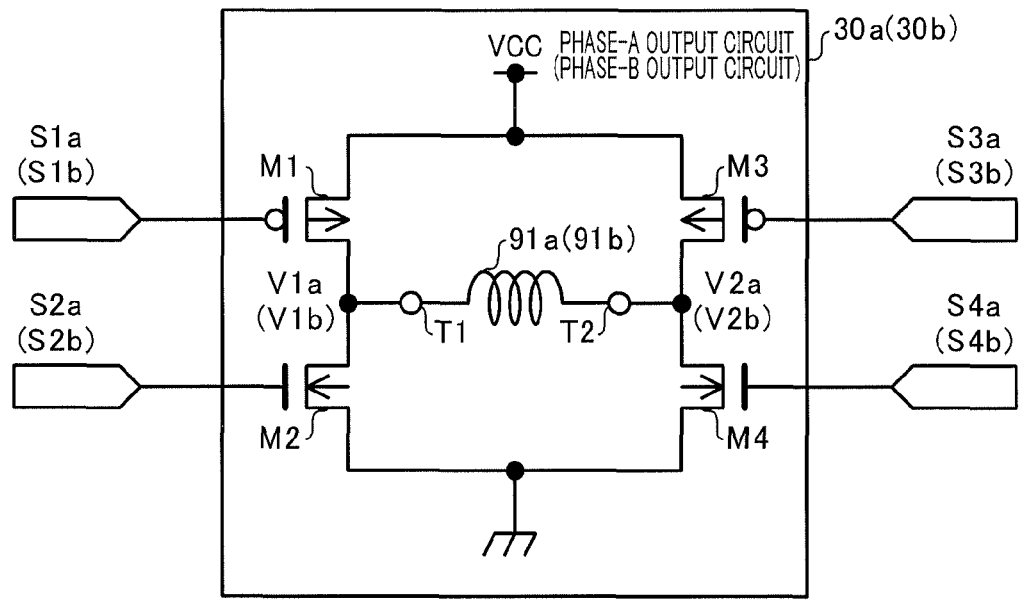
FIG. 2 is a circuit block diagram of an example of a specific configuration of a phase-A output circuit 30a (a phase-B output circuit 30b)

The phase-A output circuit 30a (phase-B output circuit 30b) depicted in FIG. 2 is configured as an H-bridge circuit that includes the output transistors M1 to M4. In the following description, as an example, a description will be made of the case where the output transistors M1 and M3 on a high side are PMOS (P-channel Metal-Oxide Semiconductor) transistors and the output transistors M2 and M4 on a low side are NMOS (N-channel MOS) transistors.

The (first) output transistor M1 is connected in series to the (second) output transistor M2, and the (third) output transistor M3 is connected in series to the (fourth) output transistor M4. Sources of the output transistors M1 and M3 are connected to a power source potential VCC, and sources of the output transistors M2 and M4 are connected to a ground potential. The control signals S1a to S4a (S1b to S4b) are respectively inputted to gates of the output transistors M1 to M4.

One end of the phase-A driving coil 91a (phase-B driving coil 91b) is connected to a connection point between the output transistors M1 and M2 through a terminal T1, and the other end thereof is connected to a connection point between the output transistors M3 and M4 through a terminal T2. The voltage V1a (V1b) of the terminal T1 and the voltage V2a (V2b) of the terminal T2 are inputted to the induced voltage detecting circuit 50.

Figure 3:
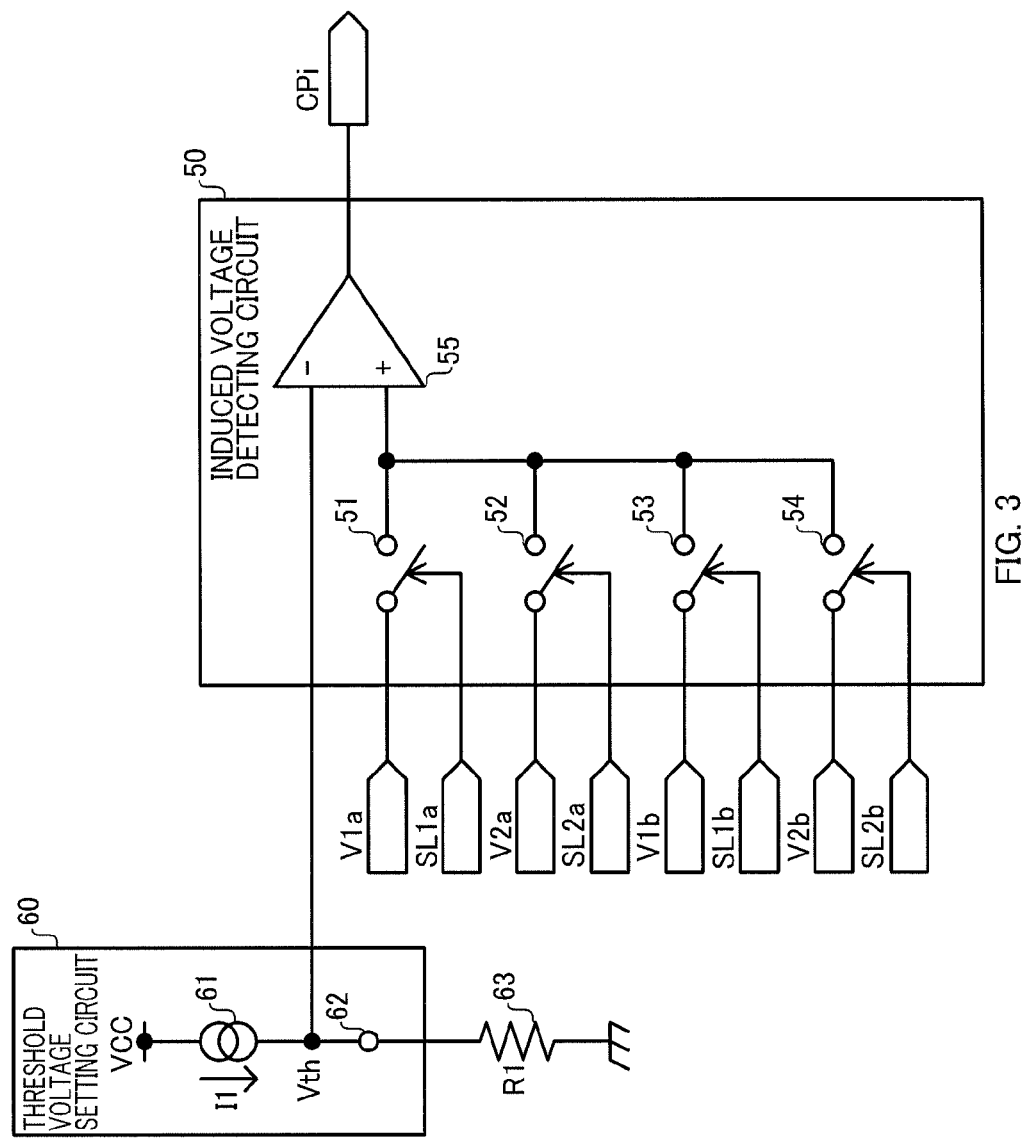
FIG. 3 is a circuit block diagram of an example of a specific configurations of an induced voltage detecting circuit 50 and a threshold voltage setting circuit 60.

Configurations of Induced Voltage Detecting Circuit and Threshold Voltage Setting Circuit More specific configurations of the induced voltage detecting circuit 50 and the threshold voltage setting circuit 60 will be described with reference to FIG. 3. FIG. 3 depicts an example of the configuration of the threshold voltage setting circuit 60 in the case where the stepping motor driving circuit is configured as an integrated circuit.

The threshold voltage setting circuit 60 depicted in FIG. 3 includes a current source 61 and an integrated circuit terminal 62.

A current I1 (predetermined current) is outputted from the current source 61. A resistor 63 having one end connected to the ground potential (predetermined potential) is externally connected to the terminal 62. The current I1 is supplied to the external resistor 63 through the terminal 62.

The induced voltage detecting circuit 50 depicted in FIG. 3 includes switching circuits 51 to 54 and a comparator 55.

The voltages V1a, V2a, V1b, and V2b are respectively applied to ends of the switching circuits 51, 52, 53, and 54, and other ends thereof are connected to one another. The selection signals SL1a, SL2a, SL1b, and SL2b are respectively inputted as control signals to the switching circuits 51, 52, 53, and 54. Each of the switching circuits 51 to 54 is on when the control signal inputted thereinto is high.

A voltage of the terminal 62 is inputted as the threshold voltage Vth to an inverting input of the comparator 55, and a non-inverting input thereof is connected to a connection point at which the other ends of the switching circuits 51 to 54 are connected one another. The comparison result signal CPi is outputted from the comparator 55.

Operation of Driving Circuit for Stepping Motor

An operation of the driving circuit for the stepping motor according to an embodiment of the present invention will be described bellow with reference to FIGS. 4 to 11 when necessary.

The clock generating circuit 80 is configured to output the PWM carrier signal PC and the sampling clock signal CKs. Here, the frequency of the sampling clock signal CKs is a frequency sufficient to sample a signal having the same frequency as that of the PWM carrier signal PC, and preferably, is a frequency that is N times the frequency of the PWM carrier signal PC (N is an integer greater than two).

The timing control circuit 10 is configured to generate the current direction signal CDa, the energization timing signal DTa, and the selection signals SL1a and SL2a from the phase-A input signal INa and the reference voltage Vref. The timing control circuit 10 is also configured to generate the current direction signal CDb, the energization timing signal DTb, and the selection signals SL1b and SL2b from the phase-B input signal INb and the reference voltage Vref. The phase-A and the phase-B input signals INa and INb are sine wave signals having the same cycle and having phases different from each other. These phases are shifted from each other by 90 degrees when these signals drive the two-phase bipolar excitation type stepping motor 90.

The control signal generating circuit 20 is configured to generate the control signals S1a to S4a and the output-state signals P1a and P2a from the PWM carrier signal PC, the current direction signal CDa, the energization timing signal DTa, and the comparison result signal CPa. The control signal generating circuit 20 is also configured to generate the control signals S1b to S4b and the output-state signals P1b and P2b from the PWM carrier signal PC, the current direction signal CDb, the energization timing signal DTb, and the comparison result signal CPb.

Figure 4:
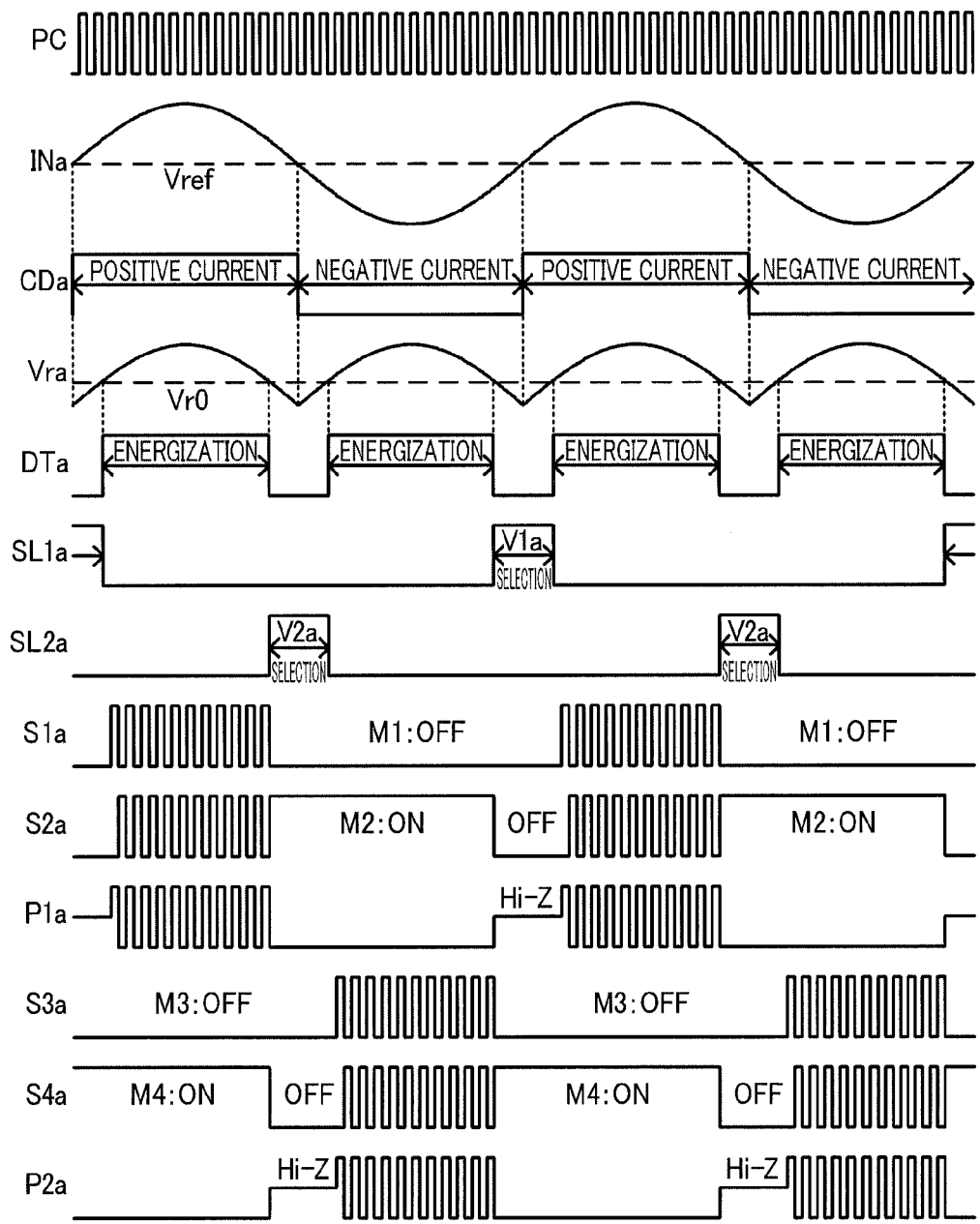
FIG. 4 is an explanatory diagram of operations of a timing control circuit 10 and a control signal generating circuit 20 executed for a phase "A"

The relationship among the signals related to the phase-A driving coil 91a out of the signals inputted/outputted to/from the timing control circuit 10 and the control signal generating circuit 20 is depicted in FIG. 4.

The timing control circuit 10 is configured to generate, using a comparator, etc., the current direction signal CDa that is low when $INa < Vref$ and that is high when $INa \geq Vref$. The current direction signal CDa indicates the direction of the driving current supplied to the phase-A driving coil 91a. In the following description, it is assumed that, when the current direction signal CDa is high ($INa \geq Vref$), a driving current in a direction from the terminal T1 to the terminal T2 in FIG. 2 (hereinafter, referred to as "positive current") is supplied, and when the current direction signal CDa is low ($INa < Vref$), a driving current in a direction from the terminal T2 to the terminal T1 (hereinafter, referred to as "negative current") is supplied.

The timing control circuit 10 is configured to generate, using a diode bridge, etc., a voltage Vra by full-wave-rectifying the phase-A input signal INa, and generate, using a comparator, etc., the energization timing signal DTa that is low when $Vra < Vr0$ and that is high when $Vra \geq Vr0$. Here, Vr0 is a fixed voltage generated in the timing control circuit 10, for example. The energization timing signal DTa indicates a de-energized period during which no driving current is supplied to the phase-A driving coil 91a and also indicates an energized period that is the time period other than the de-energized period. In the following description, when the energization timing signal DTa is low, a de-energized period is brought about, and when the energization timing signal DTa is high, the energized period is brought about.

As such, the timing control circuit 10 is configured to generate the current direction signal CDa and the energization timing signal DTa, input these signals to the control signal generating circuit 20, thereby controlling the energized period and the de-energized period of the phase-A driving coil 91a. The timing control circuit 10 is further configured to generate the selection signal SL1a indicative of the de-energized period after the energized period during which the negative current is supplied to the phase-A driving coil 91a, out of the de-energized periods, and the selection signal SL2a indicative of the de-energized period after the energized period during which the positive current is supplied to the phase-A driving coil 91a. The selection signals SL1a and SL2a are used to select a voltage to be applied to the non-inverting input of the comparator 55 in the induced voltage detecting circuit 50 depicted in FIG. 3.

Similarly, the timing control circuit 10 is configured to generate the current direction signal CDb, the energization timing signal DTb, and the selection signals SL1b and SL2b.

The control signal generating circuit 20 is configured to generate the control signal S1a that is pulse-width-modulated in the energized period of the positive current and that is low during the time period other than the positive current energized period. The control signal generating circuit 20 is also configured to generate the control signal S2a that is pulse-width-modulated in the energized period of the positive current, that is low during the de-energized period before the energized period of the positive current, and that is high during the time period other than the above periods. During the time period (energized period of positive current) during which the pulse-width modulation is performed, the control signals S1a and S2a are high and low at the rising edge of the PWM carrier signal PC, respectively, and are low and high at the falling edge of the comparison result signal CPa, respectively.

The control signal generating circuit 20 is further configured to generate the control signal S3a that is pulse-width-modulated in the energized period of the negative current and that is low during the time period other than the negative current energized period. The control signal generating circuit 20 is also configured to generate the control signal S4a that is pulse-width-modulated in the energized period of the negative current, that is low during the de-energized period before the energized period of the negative current, and that is high during the time period other than the above time periods. During the time period (energized period of negative current) during which the pulse-width modulation is performed, the control signals S3a and S4a are high and low at the rising edge of the PWM carrier signal PC, respectively, and are low and high at the falling edge of the comparison result signal CPa, respectively.

As such, the control signal generating circuit 20 is configured to generate the control signals S1a to S4a, input these signals to the phase-A output circuit 30a, thereby, controlling the turning on/off of each of the output transistors M1 to M4 of the phase-A output circuit 30a. The control signal generating circuit 20 is also configured to generate the output-state signals P1a and P2a, respectively, indicative of the states of the output on the terminal T1 side and the output on the terminal T2 side in accordance with turning on/off of the output transistors M1 to M4. The output-state signals P1a and P2a are used to determine the timing at which the comparison result signal CPi is sampled in the determining circuit 70.

Similarly, the control signal generating circuit 20 is configured to generate the control signals S1b to S4b and the output-state signals P1b and P2b.

The phase-A output circuit 30a is configured to supply the driving current to the phase-A driving coil 91a in response to the control signals S1a and S4a. The phase-A output circuit 30a is configured to detect the current flowing through the phase-A driving coil 91a using a current detection resistor, etc., and output the current detection signal ISa indicative of the current value of the detected current.

Further, the phase-A current control circuit 40a is configured to compare the current detection signal ISa with the signal, which is the lower one out of the phase-A input signal INa and the current limit signal LIM, and output the comparison result signal CPa. The comparison result signal CPa goes low when the current detection signal ISa reaches the above lower signal, and is used to control the duty ratio of the pulse-width modulation for the control signals S1a to S4a in the control signal generating circuit 20.

During the energized period of the positive current depicted in FIG. 4, in the phase-A output circuit 30a, the output transistor M3 is off; the output transistor M4 is on; and the output transistors M1 and M2 are controlled as to on/off in a manner complementary to each other. Therefore, in the phase-A output circuit 30a, the time period for supplying the positive current to the phase-A driving coil 91a during which the output transistor M1 is on and the short brake (short-circuit break) time period during which the output transistor M2 is on, are repeated in an alternate manner. During this time period, the output-state signal P1a is pulse-width-modulated similarly to the control signal S1a and the output-state signal P2a is low.

During the de-energized period after the energized period of the positive current, in the phase-A output circuit 30a, only the output transistor M2 is on and other output transistors are off. Therefore, in the phase-A output circuit 30a, an output on the terminal T1 side is connected to the ground potential and an output on the terminal T2 side is in a high-impedance state.

In these time periods, the output-state signal P1a is low and the output-state signal P2a is in a high-impedance state.

During the energized period of the negative current, in the phase-A output circuit 30a, the output transistor M1 is off; the output transistor M2 is on; and the output transistors M3 and M4 are controlled as to on/off in a manner complementary to each other. Therefore, in the phase-A output circuit 30a, the time period for supplying the negative current to the phase-A driving coil 91a during which the output transistor M3 is on and the short brake time period during which the output transistor M4 is on, are repeated in an alternate manner. During this time period, the output-state signal P1a is low and the output-state signal P2a is pulse-width-modulated similarly to the control signal S3a.

During the de-energized period after the energized period of the negative current, in the phase-A output circuit 30a, only the output transistor M4 is on and other output transistors are off. Therefore, in the phase-A output circuit 30a, the output on the terminal T1 side is in a high-impedance state and the output on the terminal T2 side is connected to the ground potential. In this time period, the output-state signal P1a is in a high-impedance state and the output-state signal P2a is low.

As such, the phase-A output circuit 30a is configured to supply the positive and the negative currents to the phase-A driving coil 91a in an alternate manner during the energized periods with the de-energized period therebetween.

On the other hand, the phase-B output circuit 30b is configured to supply the driving current to the phase-B driving coil 91b in response to the control signals S1b to S4b. The phase-B output circuit 30b is configured to detect the current flowing through the phase-B driving coil 91b using a current detection resistor, etc., and output the current detection signal ISb indicative of the current value of the detected current.

The phase-B current control circuit 40b is configured to compare the current detection signal ISb with the signal that is the lower one out of the phase-B input signal INb and the current limit signal LIM, and output the comparison result signal CPb. The comparison result signal CPb goes low when the current detection signal ISb reaches the above lower signal, and is used to control the duty ratio of the pulse-width modulation with respect to the control signals S1b to S4b in the control signal generating circuit 20.

Similarly to the phase-A output circuit 30a, the phase-B output circuit 30b is configured to supply the positive and the negative currents to the phase-B driving coil 91b in an alternate manner during the energized periods with the de-energized period therebetween.

The threshold voltage setting circuit 60 is configured to output the threshold voltage Vth (=I1×R1) set based on a resistance value R1 of the resistor 63 and the current I1 outputted from the current source 61. During the de-energized period, the induced voltage detecting circuit 50 compares, with the threshold voltage Vth, the voltage selected from the voltages V1a, V1b, V2a and V2b respectively corresponding to the selection signals SL1a, SL1b, SL2a, and SL2b, and output the comparison result signal CPi. The comparison result signal CPi goes high in response to the detection of the induced voltage when the voltage to be compared is equal to or higher than the threshold voltage Vth, and goes low when the voltage to be compared is lower than the threshold voltage Vth.

As described above, in the phase-A output circuit 30a (phase-B output circuit 30b), during each de-energized period, both of the high-side output transistors M1 and M3 are off and only one of the low-side output transistor M2 and M4 is on. Therefore, the voltage at the terminal in a high-impedance state is the voltage with respect to the ground voltage, thereby being able to be compared, as it is, with the threshold voltage Vth in the induced voltage detecting circuit 50. Thus, unlike in the case where all of the output transistors M1 to M4 are off in the phase-A output circuit 30a (phase-B output circuit 30b), it is not necessary to acquire a differential voltage between the terminals T1 and T2, and any differential amplifier circuit, etc., for acquiring the differential voltage are unnecessary.

Figure 5:
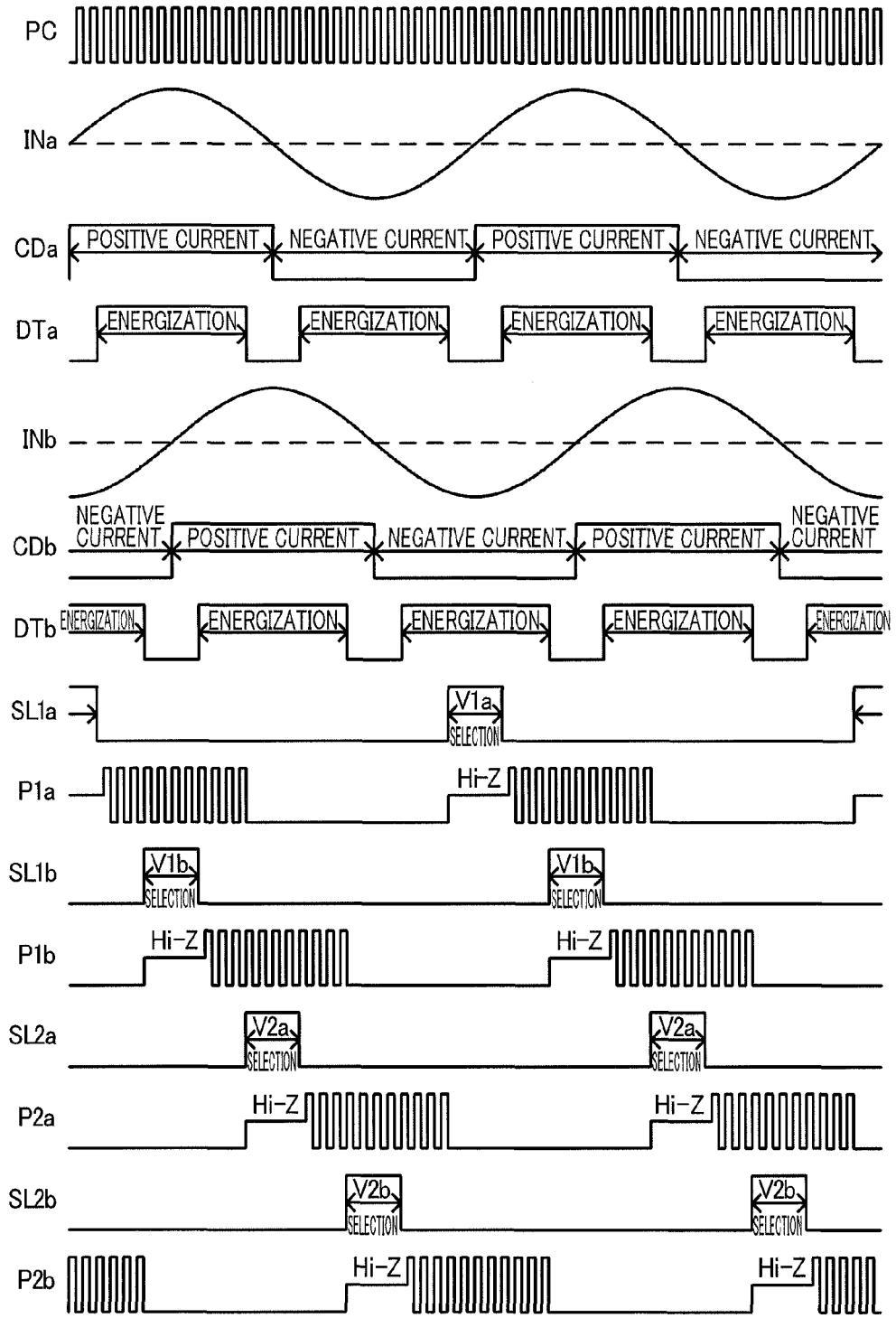
FIG. 5 is an explanatory diagram of operations of a timing control circuit 10 and a control signal generating circuit 20 executed for a phase "A" and a phase "B"

FIG. 5 depicts the relationship between the selection signals SL1a, SL2a, SL1b, and SL2b indicative of the de-energized period and the output-state signals P1a, P2a, P1b, and P2b indicative of the states of the output on the terminal T1 side and the output on the terminal T2 side of the phase-A output circuit 30a (phase-B output circuit 30b).

As depicted in FIG. 5, the output-state signal P1a (output on the terminal T1 side of the phase-A output circuit 30a), the output-state signal P1b (output on the terminal T1 side of the phase-B output circuit 30b), the output-state signal P2a (output on the terminal T2 side of the phase-A output circuit 30a), and the output-state signal P2b (output on the terminal T2 side of the phase-B output circuit 30b) become in the high-impedance state in this order.

During the de-energized period during which the output-state signal P1a is in the high-impedance state, the selection signal SL1a is high and the voltage V1a at the terminal T1 of the phase-A output circuit 30a is selected as the voltage to be compared with the threshold voltage Vth. During the de-energized period during which the output-state signal P1b is in the high-impedance state, the voltage V1b at the terminal T1 of the phase-B output circuit 30b is selected. During the de-energized period during which the output-state signal P2a is in the high-impedance state, the voltage V2a at the terminal T2 of the phase-A output circuit 30a is selected. During the de-energized period during which the output-state signal P2b is in the high-impedance state, the voltage V2b at the terminal T2 of the phase-B output circuit 30b is selected.

Therefore, in the de-energized periods, the voltage at the terminal in the high-impedance state is selected as the voltage to be compared. However, as depicted in FIG. 5, each of the de-energized periods is in the energized period for the driving coil having a phase different from that of the driving coil in the de-energized period, and thus the voltage to be compared may be influenced by the driving current supplied to the driving coil having the phase different therefrom, and may be changed. For example, during the de-energized period during which the output-state signal P1b is in the high-impedance state, the output-state signal P1a, which was in the high-impedance state prior to this de-energized period, is pulse-width-modulated. Therefore, the voltage V1b to be compared is influenced by the driving current supplied to the phase-A driving coil 91a, and is fluctuated as depicted in FIG. 6, for example.

Figure 6:
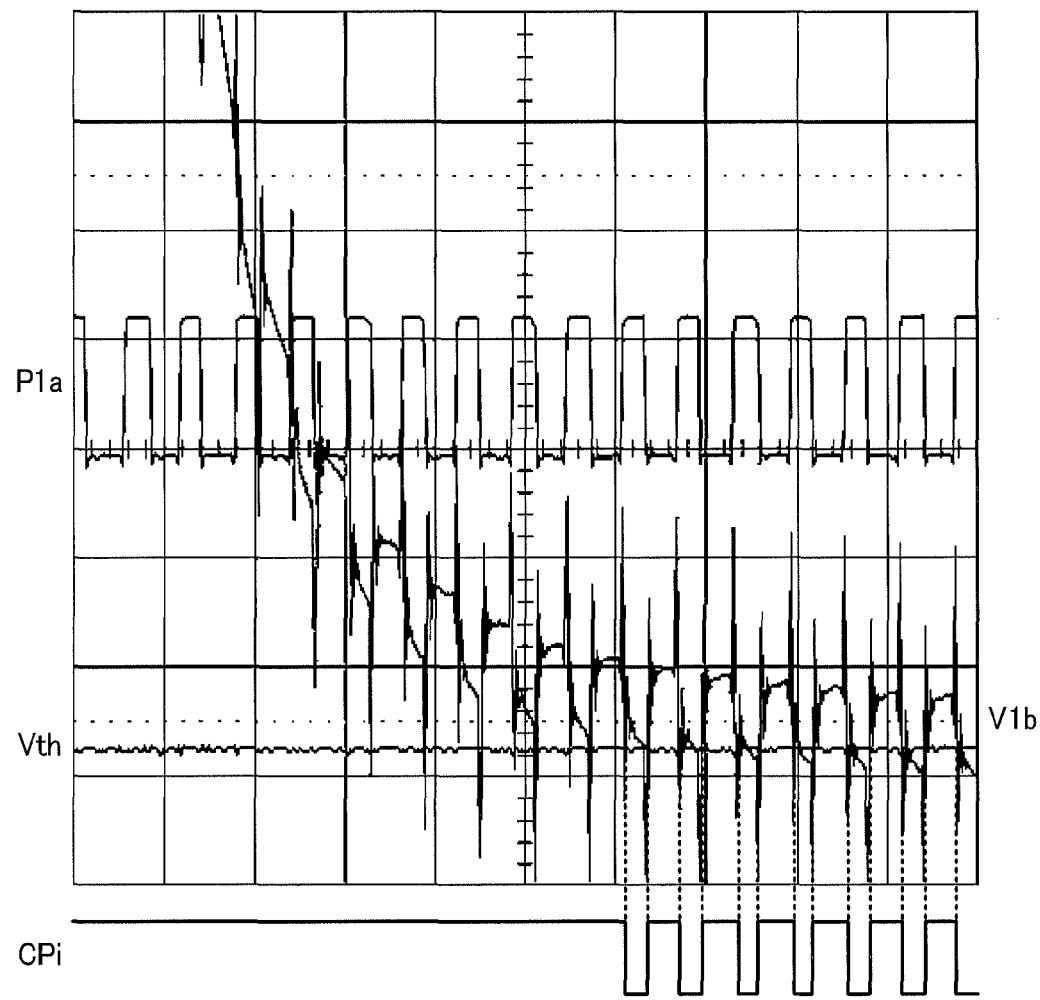
FIG. 6 is an explanatory diagram of an operation of the induced voltage detecting circuit 50.

As depicted in FIG. 6, a high kick-back voltage is generated immediately after the start of the de-energized period, and therefore, the voltage V1b to be compared is significantly changed. Further, the rotation of the stepping motor 90 is unstable immediately after staring up, and therefore, the voltage V1b to be compared is not stabilized. Thus, the induced voltage detecting circuit 50 may erroneously detect the induced voltage.

Therefore, the determining circuit 70 executes the determination of the collision state at the timing at which the driving current supplied to the driving coil having a phase different therefrom, the kick-back voltage generated immediately after the start of the de-energized period, the unstable rotation occurring immediately after the starting up, etc., do not exert influences thereon.

Figure 7:
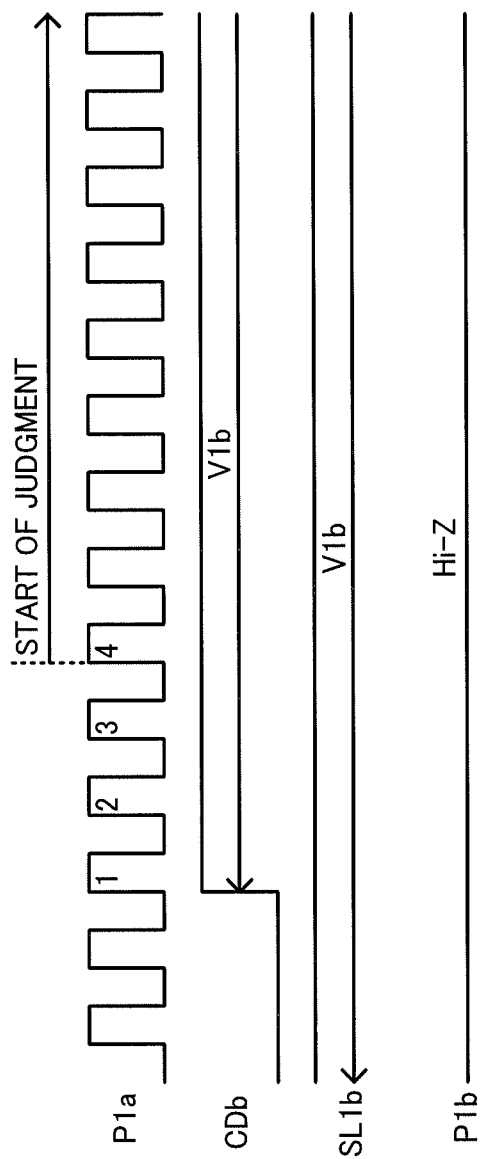
FIG. 7 is an explanatory diagram of a condition for a determining circuit 70 to start determination on presence of a collision state immediately after a start of a de-energized period.

In order to avoid the influence of the kick-back voltage, the determining circuit 70 starts the determination of the presence of the collision state after the predetermined time period has elapsed from the start of each of the de-energized periods. For example, as depicted in FIG. 7, after the start of the de-energized period during which the output-state signal P1b is in the high-impedance state, the determining circuit 70 starts the determination of the presence of the collision state, after four pulses of the pulse-width-modulated output-state signal P1a has been counted from the time immediately after the change of the current direction signal CDb (from the rising edge in this de-energized period). Therefore, the determining circuit 70 determines the presence of the collision state only based on the comparison result signal CPi acquired after the predetermined time period has elapsed from the start of the de-energized period, thereby being able to avoid the influence of the kick-back voltage occurring immediately after the start of the de-energized period.

Figure 8:
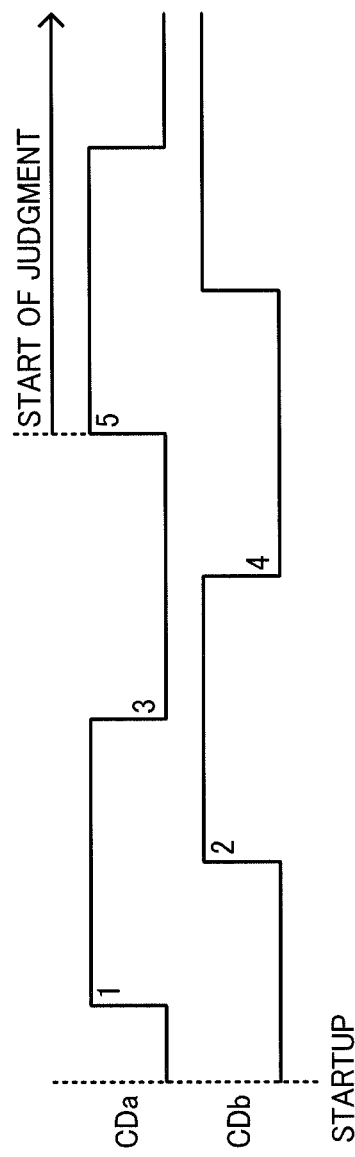
FIG. 8 is an explanatory diagram of a condition for a determining circuit 70 to start determination on presence of a collision state immediately after starting up.

In order to avoid the influence of the unstable rotation, the determining circuit 70 starts the determination of the presence of the collision state after the number of energizations of the phase-A and the phase-B driving coils 91a and 91b reaches the predetermined number of times from the starting up. For example, as depicted in FIG. 8, the determining circuit 70 starts the determination of the presence of the collision state after either edge (of the rising edge and the falling edge) of the current direction signals CDa and CDb has been counted five times from the time immediately after the starting up of the stepping motor 90. Therefore, the determining circuit 70 determines the presence of the collision state only based on the comparison result signal CPi acquired after the number of energizations reaches the predetermined number of times from the starting up, thereby being able to avoid the influence of the unstable rotation occurring immediately after the starting up.

Figure 9:
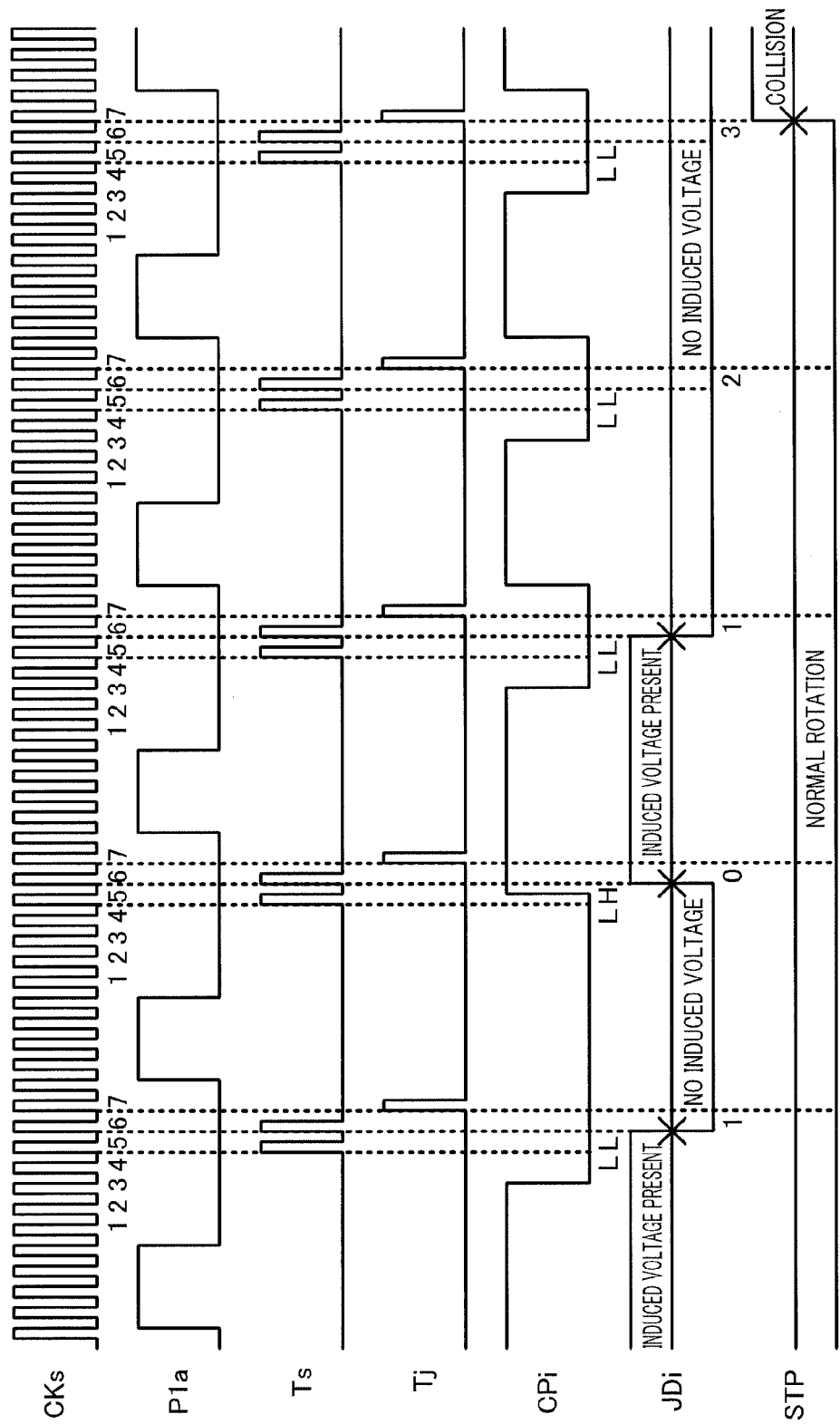
FIG. 9 is an explanatory diagram of an operation of a determining circuit 70.

Further, in order to avoid the influence of the driving current supplied to the driving coil having a different phase, the determining circuit 70 samples the comparison result signal CPi at the timing at which no driving current is supplied to any of the phase-A and the phase-B driving coils 91a and 91b. FIG. 9 depicts an example of the timing at which the comparison result signal CPi is sampled. In FIG. 9, as an example, the frequency fs of the sampling clock signal CKs is 12 times the frequency fp of the PWM carrier signal PC (fs=12 fp).

As depicted in FIG. 9, the determining circuit 70 generates a sampling timing signal Ts indicative of the fifth and the sixth pulses of the sampling clock signal CKx from the falling edge of the phase-width-modulated output-state signal (for example, "P1a") in the de-energized period; samples the comparison result signal CPi at the timing indicated by the sampling timing signal Ts; and causes a determination result signal JDi to go low (indicating no induced voltage) in the case where both of the two sampling results are low and causes the determination result signal JDi to go high (indicating presence of induced voltage) in other cases.

The determining circuit 70 is configured to generate a determination timing signal Tj indicative of the seventh pulse of the sampling clock signal CKs from the falling edge of an output-state signal which is pulse-width-modulated in the de-energized period; sample the determination result signal JDi at the timing indicated by the determination timing signal Tj; and, when the determination result signals JDi are low (indicating no induced voltage) for the three consecutive times, determine the presence of the collision state and cause the stop signal STP to go high.

As such, the determining circuit 70 is configured to determine the presence of the collision state by sampling the comparison result signal CPi at the predetermined timing from the falling edge of the output-state signal that is pulse-width-modulated in the de-energized period. As depicted in FIG. 5, when the output-state signal pulse-width-modulated in the de-energized period is low, the outputs of the phase-A and the phase-B output circuits 30a and 30b both are low (three outputs) or in the high-impedance state (one output). Therefore, the determining circuit 70 is configured to determine the presence of the collision state only based on the comparison result signal CPi obtained when no driving current is supplied to any of the phase-A and the phase-B driving coils 91a and 91b, thereby being able to avoid the influence of the driving current supplied to the driving coil having a different phase.

In FIG. 9, when the duty ratio of the output-state signal P1a is equal to or higher than 50%, the output-state signal P1a may go high again at the timing before that of the sampling timing signal Ts. However, as depicted in FIG. 5, the de-energized period is positioned in the vicinity of the timing at which the current flowing in the driving coil having different phase reaches its peak, and therefore, the duty ratio of the output-state signal pulse-width-modulated in the de-energized period is usually equal to or lower than 50%.

In FIG. 9, assuming fs=12 fp, as an example, the comparison result signal CPi is sampled at the timing of the fifth and the sixth pulses of the sampling clock signal CKs from the falling edge of the output-state signal, but this is not limited thereto. For example, when fs=2n×fp (i.e., n=8), the comparison result signal CPi may be sampled at the timing of the (n−1) th and n-th pulses of the sampling clock signal CKs from the falling edge of the output-state signal. In this case, the determination result signal JDi may be sampled at the timing of the (n+1) th pulse of the sampling clock signal CKs from the falling edge of the output-state signal.

When the stop signal STP outputted from the determining circuit 70 goes high, the phase-A and the phase-B output circuits 30a and 30b respectively stop the supply of the driving currents to the phase-A and the phase-B driving coils 91a and 91b. Therefore, even when the rotor stops in the collision state, as in the case of the stepping motor driving apparatus of Japanese Laid-Open Patent Publication No. 2009-65806, it is possible to prevent wearing away of the screw shaft rotated by the stepping motor, the gear portion to mesh with the screw shaft, etc. Whereas, even if the screw shaft is rotated free and the rotor does not stop in the collision state as in the case of the pickup moving apparatus of Japanese Laid-Open Patent Publication No. 2000-173203, the rotation becomes high-load rotation, and therefore, it is desirable to cause the stop signal STP to go high and stop the supply of the driving current.

Figure 10:
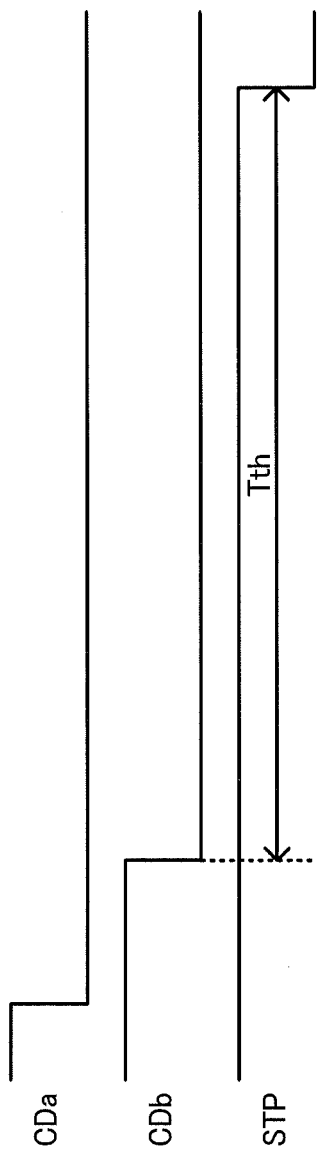
FIG. 10 is an explanatory diagram of a condition for a determining circuit 70 to restart supply of a driving current after determining the presence of a collision state.

As depicted in FIG. 10, when such a state where neither of the current direction signals CDa or CDb changes has been continued during a time period equal to or longer than a threshold time period Tth, in a state where the stop signal STP is high, the determining circuit 70 sets the stop signal STP at low. Therefore, a control apparatus, such as a microcomputer configured to control the optical pickup, is configured to stop the input of the phase-A and the phase-B input signals INa and INb for the threshold time period Tth, thereby resetting the determination result that the collision state is present, to be able to start to move the optical pickup in the opposite direction.

Figure 11:
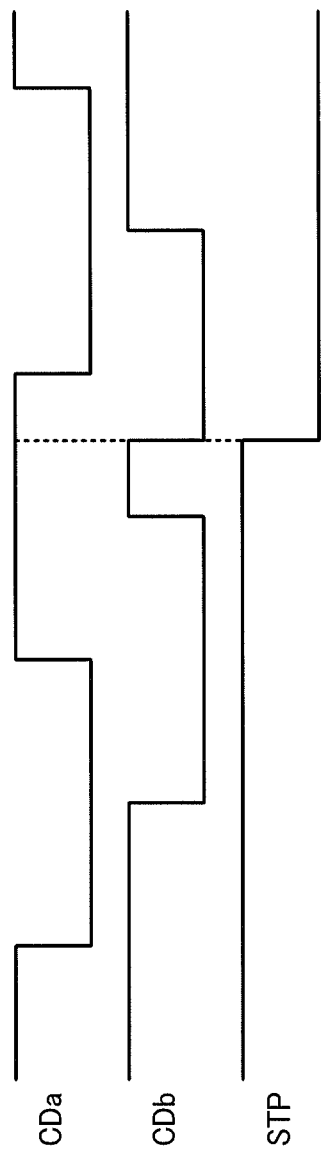
FIG. 11 is an explanatory diagram of a condition for a determining circuit 70 to restart supply of the driving current after determining the presence of the collision state.

Further, as depicted in FIG. 11, the determining circuit 70 also sets the stop signal STP at low when the phase relationship between the current direction signals CDa and CDb is inverted in a state where the stop signal STP is high. Therefore, the control apparatus inputs the phase-A and the phase-B input signals INa and INb in a phase relationship therebetween inverted so as to reversely rotate the stepping motor 90, thereby being able to start to move the optical pickup in the opposite direction without standing by for the threshold time period Tth.

As described above, in the stepping motor driving circuit configured to move the optical pickup in the radial direction of the optical disc depicted in FIG. 1, while the positive and the negative currents are supplied in an alternate manner to the phase-A and the phase-B driving coils 91a and 91b during energized periods with the de-energized period therebetween, the induced voltage is detected by comparing the voltage V1a, V1b, V2a, or V2b generated in the phase-A or the phase-B driving coil 91a or 91b with the threshold voltage Vth in each de-energized period, thereby being able to detect the collision state where the optical pickup reaches the innermost or the outermost circumferential part (end of the range of movement in the radial direction of the optical disc) based on the comparison result signal CPi indicative of the detection result without using any position detecting means, and determine the radial position of the optical pickup.

Figure 12:
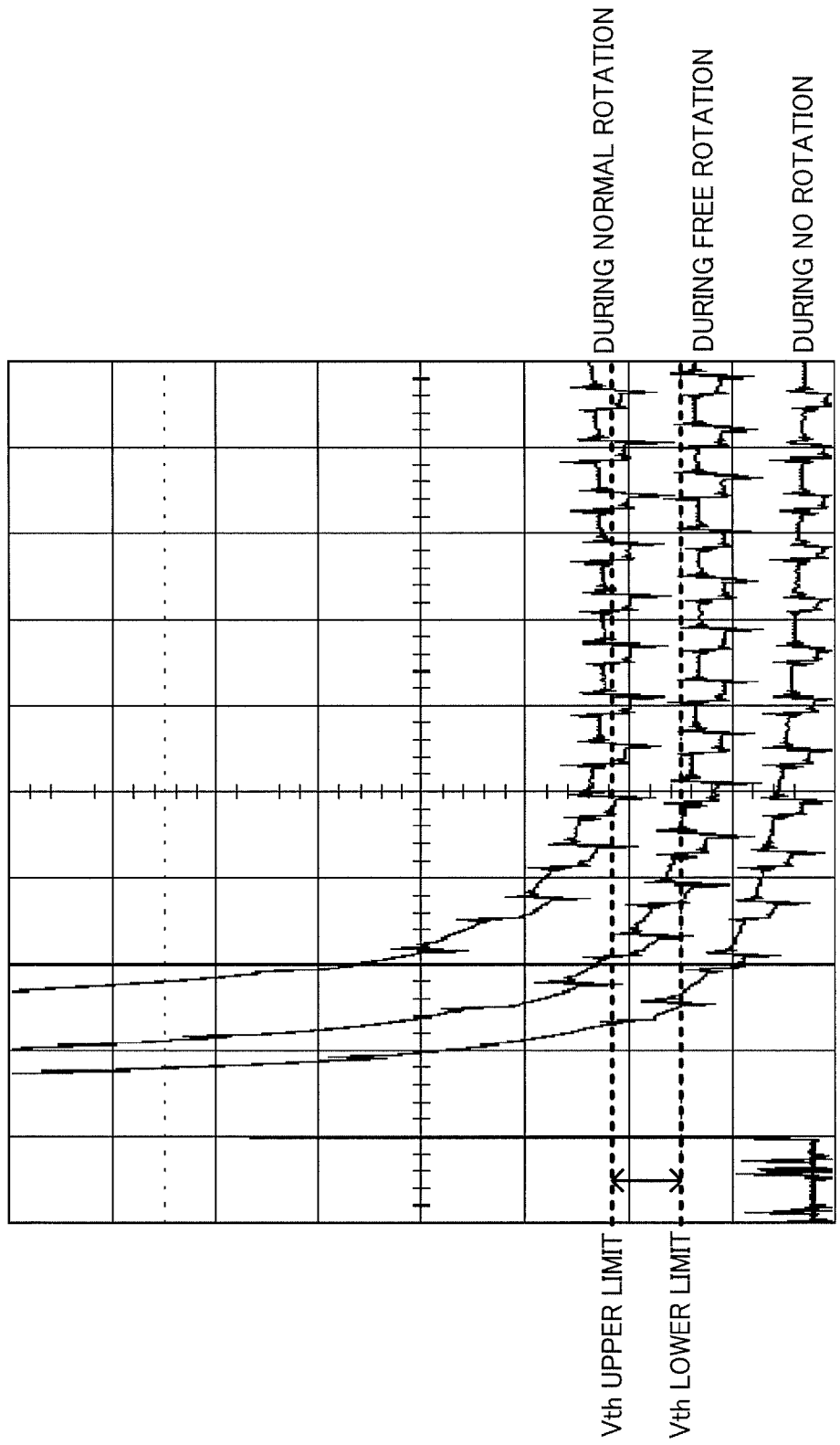
FIG. 12 is a diagram of a range for a threshold voltage setting circuit 60 to be able to set therewithin a threshold voltage Vth.

Here, for example, as depicted in FIG. 12, when the rotor does not stop but rotates under a high load in the collision state (when rotating free), the voltage to be compared with the threshold voltage Vth in the de-energized period is a voltage between the voltage acquired when the rotor stops in the collision state (when not rotating) and the voltage acquired when no collision state is present (when normally rotating). Therefore, when the rotor stops in the collision state, although the threshold voltage Vth needs to be set within a small voltage range represented by short-dashed lines in FIG. 12, this voltage range varies with the stepping motors 90 themselves and apparatuses such as the optical pickup using the stepping motor 90.

Therefore, in the stepping motor driving circuit depicted in FIG. 1, the threshold voltage setting circuit 60 is provided, and for the apparatus in which the rotor stops in the collision state, the threshold voltage Vth is set between the voltage acquired when the rotor does not rotate and the voltage acquired when the rotor normally rotates in the FIG. 12, and for the apparatus in which the rotor does not stop but rotates under a high load in the collision state, the threshold voltage Vth is set between the voltage acquired when the rotor rotates free and the voltage acquired when the rotor normally rotates in FIG. 12, thereby being able to support all of the apparatuses regardless of whether the rotor stops or rotates in the collision state.

When the stepping motor driving circuit is configured as an integrated circuit, the terminal 62 may be provided to connect the external resistor 63 and the current I1 is supplied to the resistor 63 through the terminal 62, thereby being able to set the threshold voltage Vth (=I1×R1) based on the resistor 63 and the current I1.

The determination of the presence of the collision state is executed only based on the comparison result signal CPi acquired when no driving current is supplied to any of the phase-A and the phase-B driving coils 91a and 91b, thereby being able to prevent variation in the voltage to be compared with the threshold voltage Vth, which is caused by being affected by the driving current supplied to the driving coil having a phase different from that of the driving coil in the de-energized period.

The presence of the collision state is determined only based on the comparison result signal CPi acquired after the predetermined time period has elapsed from the start of the de-energized period, thereby being able to prevent significant variation in the voltage to be compared with the threshold voltage Vth, which is caused by being affected by the kickback voltage generated immediately after the start of the de-energized period.

The presence of the collision state is determined only based on the comparison result signal CPi acquired after the number of energizations from the starting up reaches the predetermined number of times, thereby being able to prevent the induced voltage detecting circuit 50 from erroneously detecting the induced voltage, which is caused by the unstableness of the voltage to be compared with the threshold voltage Vth occurring immediately after the starting up which is when the rotation of the stepping motor 90 is unstable.

Further when it is determined that the collision state is present, the stop signal STP is set at high and both of the supply of the driving current from the phase-A output circuit 30a to the phase-A driving coil 91a and the supply of the driving current from the phase-B output circuit 30b to the phase-B driving coil 91b are stopped, thereby being able to prevent wearing away of a screw shaft that is rotated by the stepping motor 90, the gear portion that meshes with the screw shaft, etc., in the apparatus in which the rotor stops in the collision state. Furthermore, when the phase relationship between the phase-A and the phase-B input signals INa and INb is inverted to reversely rotate the stepping motor 90, the stop signal STP is set at low and the supply of the driving currents to the phase-A and the phase-B driving coils 91a and 91b is restarted, thereby being able to quickly start to move the optical pickup in the opposite direction from the innermost or the outermost circumferential part.

In the de-energized period, the high-side output transistors M1 and M3 of the phase-A output circuit 30a (phase-B output circuit 30b) both are turned off and only one of the low-side output transistors M2 and M4 is turned on, and thus the voltage at the terminal in the high-impedance state becomes equal to the voltage with respect to the ground potential, which makes any differential amplifier circuit, etc., unnecessary which are to acquire the differential voltage between the terminals T1 and T2.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A driving circuit for a stepping motor configured to move an optical pickup in a radial direction of an optical disc, the optical pickup configured to emit a laser beam to the optical disc as well as receive the laser beam reflected by the optical disc, the driving circuit comprising:
   a control signal generating circuit configured to generate a plurality of control signals for supplying driving currents to driving coils having a plurality of phases of the stepping motor during energized periods, with a de-energized period therebetween during which no driving current is supplied;
   a plurality of output circuits configured to supply the driving currents to the respective driving coils having the plurality of phases, in response to the plurality of control signals;
   an induced voltage detecting circuit configured to detect an induced voltage by comparing, with a threshold voltage, a voltage generated in each of the driving coils having the plurality of phases, during the de-energized period;
   a threshold voltage setting circuit configured to set the threshold voltage; and
   a determining circuit configured to determine whether a collision state is present where the optical pickup reaches an end of a range of movement in a radial direction of the optical disc, based on a detection result of the induced voltage detecting circuit,
   the threshold voltage set at a voltage between a voltage generated in each of the driving coils having the plurality of phases during the de-energized period when a rotor of the stepping motor stops or rotates in the collision state, and a voltage generated in each of the driving coils having the plurality of phases in the de-energized period when no collision state is present.

2. The driving circuit for a stepping motor of claim 1, wherein
   the driving circuit for the stepping motor is configured as an integrated circuit, wherein
   the threshold voltage setting circuit includes,
      a terminal at a predetermined potential by connection through a resistor externally connected, and
      a current source configured to supply a predetermined current to the resistor through the terminal, and wherein
   the threshold voltage is set based on the resistor and the predetermined current.

3. The driving circuit for a stepping motor of claim 1, wherein
   the control signal generating circuit is configured to generate the plurality of control signals that are pulse-width-modulated, wherein
   the plurality of output circuits are configured to supply the driving currents to the respective driving coils having the plurality of phases in a time period during which any of the plurality of control signals is at one logic level, in the energized period other than the de-energized period, and wherein
   the determining circuit is configured to determine whether the collision state is present, based on a detection result of the induced voltage detecting circuit acquired in a time period during which the plurality of output circuits do not supply the driving currents to any of the driving coils having the plurality of phases.

4. The driving circuit for a stepping motor of claim 2, wherein
   the control signal generating circuit is configured to generate the plurality of control signals that are pulse-width-modulated, wherein
   the plurality of output circuits are configured to supply the driving currents to the respective driving coils having the plurality of phases in a time period during which any of the plurality of control signals is at one logic level, in the energized period other than the de-energized period, and wherein
   the determining circuit is configured to determine whether the collision state is present, based on a detection result of the induced voltage detecting circuit acquired in a time period during which the plurality of output circuits do not supply the driving currents to any of the driving coils having the plurality of phases.

5. The driving circuit for the stepping motor of claim 1, wherein
   the determining circuit is configured to determine whether the collision state is present, based on a detection result of the induced voltage detecting circuit acquired after a predetermined time period has elapsed from a start of the de-energized period.

6. The driving circuit for the stepping motor of claim 2, wherein
the determining circuit is configured to determine whether the collision state is present, based on a detection result of the induced voltage detecting circuit acquired after a predetermined time period has elapsed from a start of the de-energized period.

7. The driving circuit for the stepping motor of claim 1, wherein
the determining circuit is configured to determine whether the collision state is present, based on a detection result of the induced voltage detecting circuit acquired after the number of energizations of the driving coils having the plurality of phases reaches the predetermined number of times from starting up.

8. The driving circuit for the stepping motor of claim 2, wherein
the determining circuit is configured to determine whether the collision state is present, based on a detection result of the induced voltage detecting circuit acquired after the number of energizations of the driving coils having the plurality of phases reaches the predetermined number of times from starting up.

9. The driving circuit for a stepping motor of claim 1, further comprising
a timing control circuit configured to control the energized period and the de-energized period of each of the driving coils having the plurality of phases, based on a plurality of sine wave signals having the same cycle and phases different from each other, wherein
the determining circuit is configured to, when the determining circuit determines that the collision state is present, stop supply of the driving currents from the plurality of output circuits to all of the driving coils having the plurality of phases, and restart the supply of the driving currents from the plurality of output circuits to the driving coils having the plurality of phases when a phase relationship between the plurality of sine wave signals is inverted.

10. The driving circuit for a stepping motor of claim 2, further comprising
a timing control circuit configured to control the energized period and the de-energized period of each of the driving coils having the plurality of phases, based on a plurality of sine wave signals having the same cycle and phases different from each other, wherein
the determining circuit is configured to, when the determining circuit determines that the collision state is present, stop supply of the driving currents from the plurality of output circuits to all of the driving coils having the plurality of phases, and restart the supply of the driving currents from the plurality of output circuits to the driving coils having the plurality of phases when a phase relationship between the plurality of sine wave signals is inverted.

11. The driving circuit for a stepping motor of claim 1, wherein
the plurality of output circuits each include
a high-side first output transistor and a low-side second output transistor connected in series between a power source potential and a ground potential, and
a high-side third output transistor and a low-side fourth output transistor connected in series between the power source potential and the ground potential, wherein
the driving coils having the plurality of phases each are connected between a connection point of the first and the second output transistors, and a connection point of the third and the fourth output transistors, and wherein
both of the first and the third output transistors are off, and one of the second and the fourth output transistors is on, during the de-energized period.

12. The driving circuit for a stepping motor of claim 2, wherein
the plurality of output circuits each include
a high-side first output transistor and a low-side second output transistor connected in series between a power source potential and a ground potential, and
a high-side third output transistor and a low-side fourth output transistor connected in series between the power source potential and the ground potential, wherein
the driving coils having the plurality of phases each are connected between a connection point of the first and the second output transistors, and a connection point of the third and the fourth output transistors, and wherein
both of the first and the third output transistors are off, and one of the second and the fourth output transistors is on, during the de-energized period.

* * * * *